United States Patent
Liu et al.

(10) Patent No.: US 10,043,220 B2
(45) Date of Patent: Aug. 7, 2018

(54) METHOD, DEVICE AND STORAGE MEDIUM FOR DATA PROCESSING

(71) Applicant: TENCENT TECHNOLOGY (SHENZHEN) COMPANY LIMITED, Shenzhen, Guangdong (CN)

(72) Inventors: Xiaonan Liu, Shenzhen (CN); Huan Xiong, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 526 days.

(21) Appl. No.: 14/796,639

(22) Filed: Jul. 10, 2015

(65) Prior Publication Data

US 2015/0319238 A1 Nov. 5, 2015

Related U.S. Application Data

(63) Continuation of application No. PCT/CN2013/089995, filed on Dec. 19, 2013.

(30) Foreign Application Priority Data

Apr. 25, 2013 (CN) .......................... 2013 1 0148437

(51) Int. Cl.
*H04L 29/08* (2006.01)
*G06Q 50/00* (2012.01)
(Continued)

(52) U.S. Cl.
CPC ............. *G06Q 50/01* (2013.01); *G06Q 10/10* (2013.01); *H04L 51/32* (2013.01)

(58) Field of Classification Search
USPC ........ 709/217, 224, 203, 221, 206, 219, 218
See application file for complete search history.

(56) References Cited

U.S. PATENT DOCUMENTS 5,917,482 A * 6/1999 Putnam .............. H04N 7/17336
348/425.4
6,332,161 B1 * 12/2001 Sasson .................... H04L 29/06
709/203

(Continued)

FOREIGN PATENT DOCUMENTS

CN 1863072 A 11/2006
CN 1917463 A 2/2007

(Continued)

OTHER PUBLICATIONS

Notification of the First Office Action of Chinese application No. 201310148437.5 with English abstract, dated Aug. 3, 2017.

(Continued)

*Primary Examiner* — Jude Jean Gilles
(74) *Attorney, Agent, or Firm* — Baker & Hostetler LLP

(57) ABSTRACT

A method, device and terminal for data processing are described. The method includes receiving a data exchange request, acquiring a responding user data queue corresponding to a requesting user according to a user correlation relationship, sorting and marking the responding user data queue with responding user information; converting the responding user data queue into a requesting user data queue, sorting and marking the requesting user data queue with requesting user information; and transmitting the requesting user data queue to a user terminal.

20 Claims, 6 Drawing Sheets

(51) Int. Cl.
*G06Q 10/10* (2012.01)
*G06F 17/30* (2006.01)
*H04L 12/58* (2006.01)

(56) References Cited

U.S. PATENT DOCUMENTS

| | | | |
|---|---|---|---|
| 7,978,657 B2* | 7/2011 | Choi | H04W 28/08 |
| | | | 370/232 |
| 8,825,798 B1* | 9/2014 | Johnson | G06Q 20/385 |
| | | | 709/217 |
| 9,608,972 B2* | 3/2017 | Takeuchi | H04L 63/08 |
| 2008/0298235 A1* | 12/2008 | Neugebauer | H04L 43/0864 |
| | | | 370/232 |
| 2010/0100590 A1 | 4/2010 | Palay | |
| 2010/0162263 A1* | 6/2010 | Kamalahasan | G06F 11/3414 |
| | | | 719/313 |
| 2011/0238758 A1 | 9/2011 | Liang | |
| 2012/0136929 A1 | 5/2012 | Li | |
| 2012/0221962 A1* | 8/2012 | Lew | H04L 29/12896 |
| | | | 715/752 |
| 2012/0246725 A1* | 9/2012 | Osipkov | G06F 21/572 |
| | | | 726/23 |
| 2013/0304836 A1 | 11/2013 | Ku et al. | |
| 2013/0332415 A1* | 12/2013 | Frerking | G06F 17/30578 |
| | | | 707/613 |
| 2014/0149485 A1* | 5/2014 | Sharma | H04L 67/02 |
| | | | 709/202 |

FOREIGN PATENT DOCUMENTS

| | | |
|---|---|---|
| CN | 101425093 A | 5/2009 |
| CN | 102325367 A | 1/2012 |
| CN | 102402514 A | 4/2012 |
| CN | 102447647 A | 5/2012 |
| CN | 102480513 A | 5/2012 |
| CN | 102591870 A | 7/2012 |
| CN | 102591891 A | 7/2012 |
| CN | 102833176 A | 12/2012 |
| CN | 103051511 A | 4/2013 |

OTHER PUBLICATIONS

English Translation of the Written Opinion of the International Search Authority in international application No. PCT/CN2013/089995, dated Mar. 27, 2014.

International Search Report in international application No. PCT/CN2013/089995, dated Mar. 27, 2014.

Notification of the Second Office Action of Chinese application No. 201310148437.5 with English abstract, dated Apr. 3, 2018.

* cited by examiner

METHOD, DEVICE AND STORAGE MEDIUM FOR DATA PROCESSING

CROSS REFERENCE TO RELATED APPLICATIONS

This application is a continuation application of PCT Patent Application No. PCT/CN2013/089995, entitled "Method, Device and Terminal for Data Processing" filed on Dec. 19, 2013, which claims priority to Chinese Patent Application No. 201310148437.5, entitled "Method, Device and Terminal for Data Processing" filed on Apr. 25, 2013, both of which are incorporated by reference in their entirety.

TECHNICAL FIELD

The disclosure relates to the processing technology of internet data exchange, and in particular to a method, device and storage medium for data processing.

BACKGROUND

With the popularization of the Internet technology, the way of acquiring valid data by people has turned from a conventional media like newspaper and periodical to the internet media. The data with enormous amount of information exists in the Internet, so users can directly acquire mass data from the internet according to their own demands, and also can acquire data by the way of data sharing. A large number of tools of social applications arise after the rise of the internet technology, which are designed to facilitate data sharing between users and provide multiple data sharing ways. However, there are many problems with those data sharing ways. For example, though more data is acquired through data sharing, valid data in which required by a user is unknown. Additionally, since the data sharing is based on data coexistence, the data with huge amount of information during the data exchange may lead to the system resource occupancy such as the cache occupancy when the receiving end receives the data, and the occupancy of bandwidth of network during the data exchange may increase the network overhead.

SUMMARY

In view of the above, embodiments of the disclosure provide a method, device and storage medium for data processing, which can both satisfy the data validity and ease the problems of system resource occupancy and increasing network overhead.

An embodiment of the disclosure provides a method for data processing, which includes:

receiving a data exchange request, acquiring a responding user data queue corresponding to a requesting user according to a user correlation relationship, sorting and marking the responding user data queue with responding user information;

converting the responding user data queue into a requesting user data queue, sorting and marking the requesting user data queue with requesting user information; and transmitting the requesting user data queue to a user terminal.

An embodiment of the disclosure provides a method for data processing, which includes:

triggering a data exchange request; and acquiring a requesting user data queue that is sorted and marked with requesting user information.

An embodiment of the disclosure provides a device for data processing, which includes:

an acquiring and sorting unit configured to receive a data exchange request, to acquire a responding user data queue corresponding to a requesting user according to a user correlation relationship, and to sort and mark the responding user data queue with responding user information;

a converting and sorting unit configured to convert the responding user data queue from the acquiring and sorting unit into a requesting user data queue, and to sort and mark the requesting user data queue with requesting user information; and a transmitter configured to transmit the requesting user data queue from the converting and sorting unit to a user terminal.

An embodiment of the disclosure provides a terminal for data processing, which includes:

a data requesting unit configured to trigger a data exchange request; and a data acquiring unit configured to acquiring a requesting user data queue that is sorted and marked with requesting user information.

An embodiment of the disclosure provides a non-transitory computer-readable storage medium including a set of instructions that, when executed, cause at least one processor to implement the above methods of the disclosure.

According to the technical solutions of the disclosure, a responding user data queue corresponding to a requesting user is acquired according to a user correlation relationship, so the data acquired after processing is complete and is valid data mostly relevant to the requesting user, which therefore cannot only satisfy the requirement of data validity but also ease the problems of system resource occupancy and increasing network overhead.

DETAILED DESCRIPTION

Two solutions are provided to process data to acquire valid data.

Solution 1: The data transmitted during the data exchange adopts a data format with a fixed memory capacitance. For example, an upper limit of a data size is set and the data is processed according to a first-in first-out way. Problems of this solution are that the data format with an upper limit of the data size cannot express completely all the data because the data exceeding the upper limit of data size cannot be supported. That is, this solution only directs to part of data rather than all of data, which leads to a small data size that may eases the problems of system resource occupancy and increasing network overhead. However, since the solution does not direct to all of data, the analysis is inaccurate and may lead to the probability of acquiring valid data is significantly reduced.

Solution 2: The data format of the data transmitted during the data exchange may not be limited. Different for the Solution 1, Solution 2 directs to all of data to acquire valid data. Since no upper limit of the data size is set, this solution can express completely all the data and perform data processing based on all the data. Therefore, the analysis is accurate and the probability of obtaining valid data is significantly increased. However, the process of acquiring all the data during data exchange involves a large quantity of data, which cannot ease the problems of system resource occupancy and increasing network overhead.

In view of the above, neither of the above solutions can both satisfy data validity and ease the problems of system resource occupancy and increasing network overhead.

To address the problems of the above two solutions, the disclosure provides the following preferable technical solutions.

According to an embodiment of the disclosure, a data exchange request is received, a responding user data queue corresponding to a requesting user is acquired according to a user correlation relationship, and the responding user data queue is sorted and marked by responding user information; the responding user data queue is converted into a requesting user data queue, which is sorted and marked with requesting user information; the requesting user data queue is transmitted to a user terminal.

The disclosure provides a method for data processing, embodiments of which are detailed below in conjunction with the drawings.

Method Embodiment 1

Figure 1:
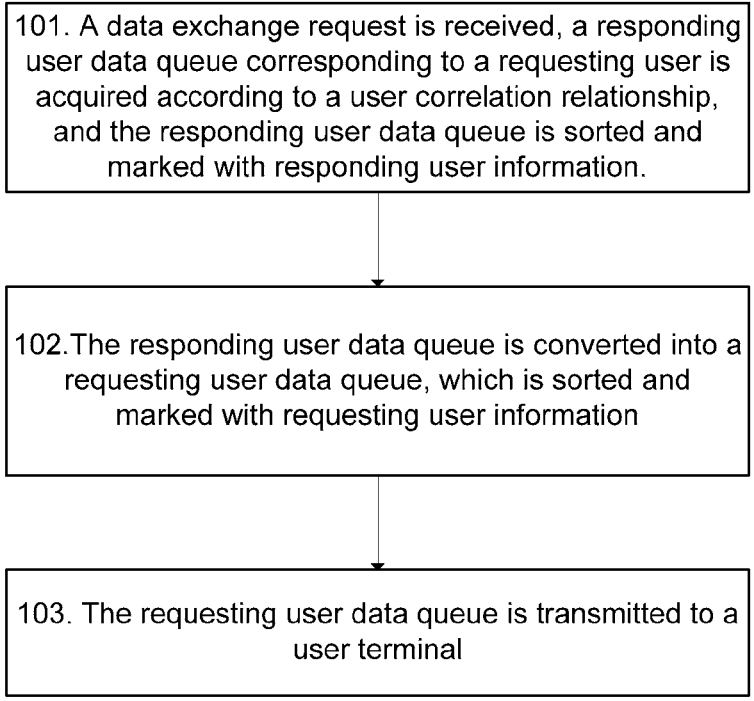
FIG. 1 illustrates an implementation flow of method embodiment 1 of the disclosure.

As shown in FIG. 1, a method for data processing includes the following steps:

At step 101, a data exchange request is received, a responding user data queue corresponding to a requesting user is acquired according to a user correlation relationship, and the responding user data queue is sorted and marked with responding user information.

At this step, the data exchange request is triggered when the requesting user logs in successfully through a user account number.

A data structure of the responding user data queue is that the responding user data queue is sorted and marked with responding user information. The specific structure form of the responding user data queue is described in subsequent method embodiments.

At step 102, the responding user data queue is converted into a requesting user data queue, which is sorted and marked with requesting user information.

At this step, the requesting user data queue is stored in a database, which may be Redis. Redis is the name of a database, which is a key-value database with high performance and is an open source memory database.

The requesting user data queue is identified by a user account number, that is, the requesting user data queue is a queue that includes the requesting user information and is identified by the user account number. The requesting user information includes a timestamp, which identifies the time when the requesting user logs in successfully. The timestamp may exist independently without being included in the requesting user information. In other words, the timestamp may be encapsulated into the requesting user data queue in either of the following two ways: directly adding a time when the requesting user logs in successfully in the form of timestamp into corresponding requesting user information included in the requesting user data queue; or adding the time when the requesting user logs in successfully in the form of timestamp into the requesting user data queue, the timestamp and the corresponding requesting user information are respectively included in the requesting user data queue. The specific structure form of the requesting user data queue is described in subsequent method embodiments.

At step 103, the requesting user data queue is transmitted to a user terminal.

In an embodiment of the disclosure, before the requesting user data queue is transmitted to the user terminal, the timestamp is encapsulated into corresponding requesting user information included in the requesting user data queue.

In an embodiment of the disclosure, before the requesting user data queue is transmitted to the user terminal, invalid data is deleted from the requesting user data queue.

The step of deleting the invalid data may include the following steps: periodic scanning or timing scanning is performed on the requesting user data queue, if certain requesting user information has no update when the timestamp exceeds a preset upper limit of time, it is determined that the certain requesting user information is invalid data, and then the certain requesting user information is deleted from the requesting user data queue.

The periodic scanning is that scanning is performed according to a preset frequency, such as one day, one week, etc. The timing scanning is that scanning is performed at a preset time point, such as nine O'clock, ten O'clock, etc.

Method Embodiment 2

Figure 2:
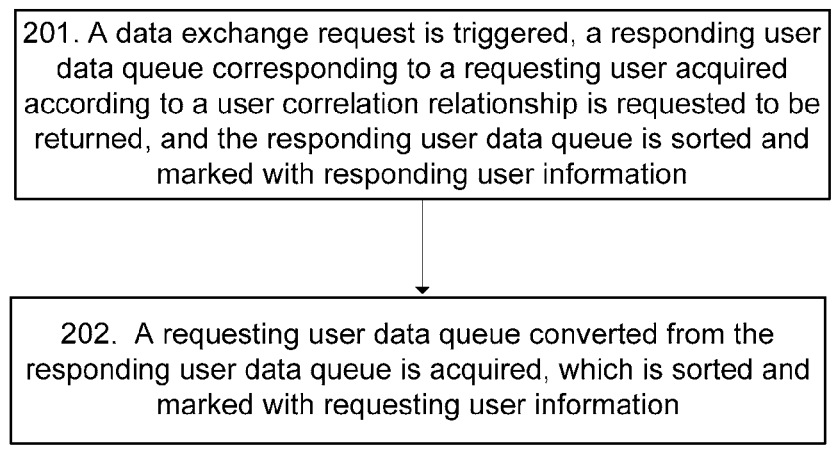
FIG. 2 illustrates an implementation flow of method embodiment 2 of the disclosure.

As shown in FIG. 2, a method for data processing of the disclosure includes the following steps:

At step 201, a data exchange request is triggered, a responding user data queue corresponding to a requesting user acquired according to a user correlation relationship is requested to be returned, and the responding user data queue is sorted and marked with responding user information.

At this step, the data exchange request is triggered when the requesting user logs in successfully through a user account number.

At step 202, a requesting user data queue converted from the responding user data queue is acquired, which is sorted and marked with requesting user information.

In an embodiment of the disclosure, before the step of acquiring the requesting user data queue, a timestamp, which identifies the time when the requesting user logs in successfully, is included in the data exchange request that is sent to a server.

After the requesting user data queue converted from the responding user data queue is acquired, the requesting user data queue is displayed, in which the timestamp is included.

The method for data processing can ensure the validity of the data, and reduce the system resource occupy and network overhead.

The disclosure further provides a device for data processing, embodiments of which are detailed below in conjunction with the drawings.

The device for data processing may be located in a background server.

Device Embodiment

Figure 3:
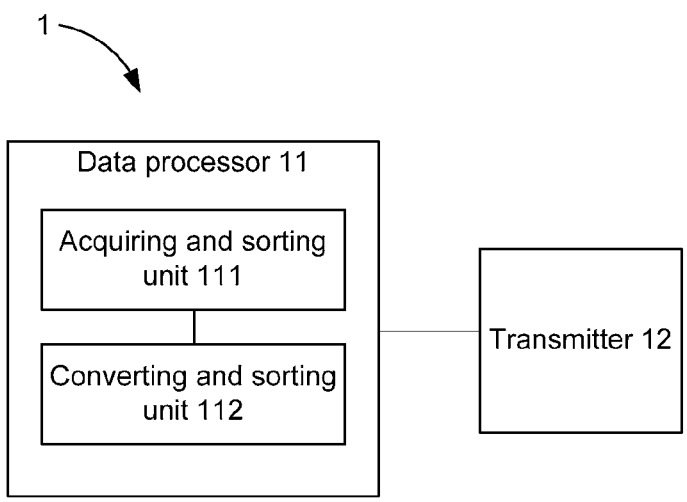
FIGS. 3-6 illustrate structures of device embodiments of the disclosure.

As shown in FIG. 3, a device for data processing 1 of the disclosure includes a data processor 11 and a transmitter 12.

The data processor 11 may include an acquiring and sorting unit 111 and a converting and sorting unit 112.

The acquiring and sorting unit 111 may be configured to receive a data exchange request, to acquire a responding user data queue corresponding to a requesting user according to a user correlation relationship, and to sort and mark the responding user data queue with responding user information;

the converting and sorting unit 112 may be configured to convert the responding user data queue from the acquiring and sorting unit 111 into a requesting user data queue, and to sort and mark the requesting user data queue with requesting user information; and the transmitter 12 may be configured to transmit the requesting user data queue from the converting and sorting unit 112 to a user terminal.

Figure 4:
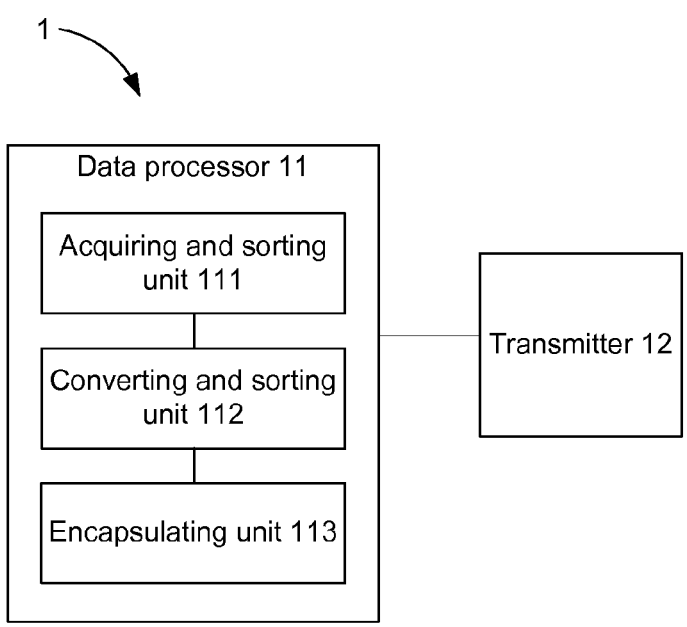

In an embodiment, as shown in FIG. 4, the data processor 11 further includes an encapsulating unit 113 configured to encapsulate a timestamp, which identifies the time when the requesting user logs in successfully, into corresponding requesting user information included in the requesting user data queue.

Figure 5:
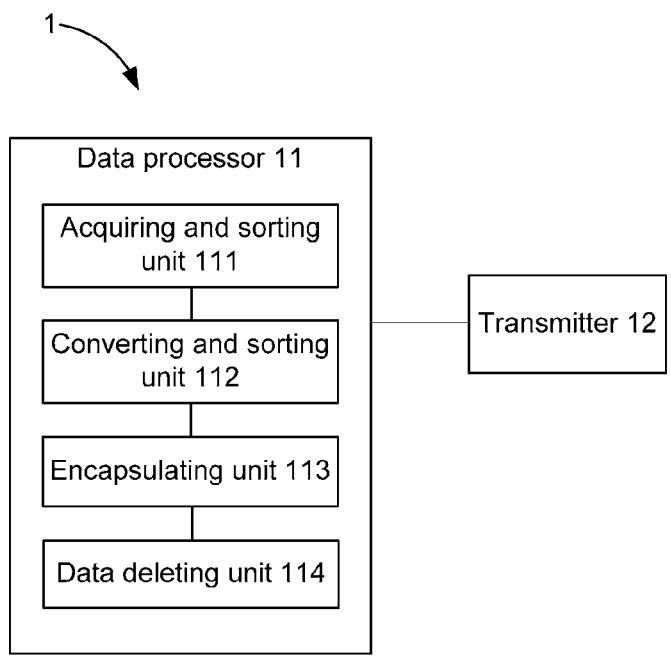

In an embodiment, as shown in FIG. 5, the data processor 11 further includes a data deleting unit 114 configured to delete an invalid data from the requesting user data queue.

The data deleting unit 114 is configured to: perform periodic scanning or timing scanning on the requesting user data queue; if certain requesting user information has no update when the timestamp exceeds a preset upper limit of time, determine that the certain requesting user information is invalid data; delete the certain requesting user information from the requesting user data queue.

Figure 6:
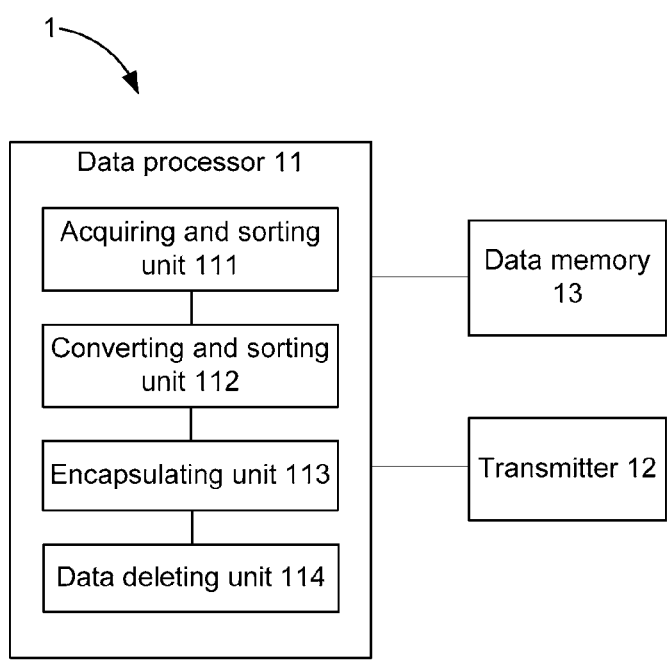

In an embodiment, as shown in FIG. 6, the device for data processing 1 further includes a data memory 13 configured to store the requesting user data queue.

The data memory may adopt a logical structure with one master module cooperating with multiple slave modules. The slave modules may be configured to perform reading operations of concurrent processing, and to read requesting user information into the master module. The requesting user information is acquired after the data exchange request is triggered when the user logs in successfully through a user account number. The master module may be configured to store the requesting user information after performing deduplication on the requesting user information from the multiple slave modules, to transmit the requesting user information after deduplication to the data processor, and to store the requesting user data queue acquired after the data processor processes the requesting user information. The slave modules may be further configured to receive, in batch processing way, requesting user information that is acquired after the data exchange request is triggered when the user logs in successfully through a user account number.

In an embodiment, instead of being incorporated in the data processor, the acquiring and sorting unit, the converting and sorting unit, the encapsulating unit and the data deleting unit may be arranged independently in the device for data processing.

The disclosure further provides a terminal for data processing, embodiment of which is detailed below in conjunction with the drawings.

The terminal for data processing may be located in a front-end user terminal.

Terminal Embodiment

Figure 7:
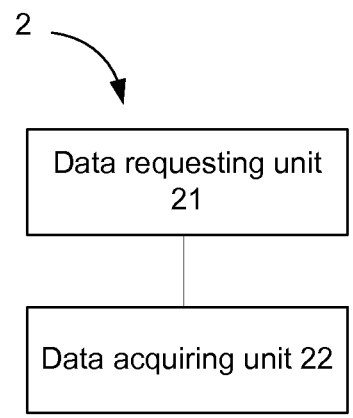
FIGS. 7-9 illustrate structures of terminal embodiments of the disclosure.

As shown in FIG. 7, a terminal for data processing 2 includes a data requesting unit 21 and a data acquiring unit 22.

The data requesting unit 21 is configured to trigger a data exchange request, to request a responding user data queue corresponding to a requesting user acquired according to a user correlation relationship to be returned. The responding user data queue is sorted and marked with responding user information.

The data acquiring unit 22 is configured to acquire a requesting user data queue converted from the responding user data queue. The requesting user data queue is sorted and marked with requesting user information.

In an embodiment, the data exchange request is triggered when the requesting user logs in successfully through a user account number.

Figure 8:
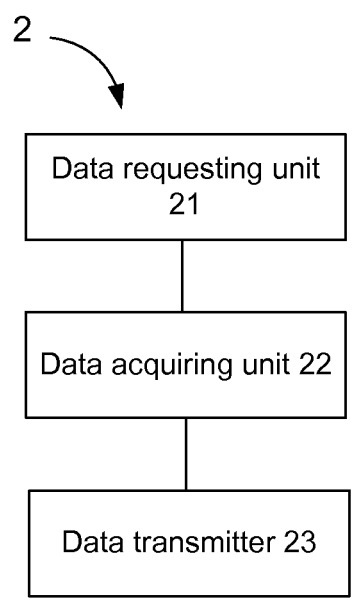

In an embodiment, as shown in FIG. 8, the terminal for data processing further includes a data transmitter 23, which is configured to transmit the data exchange request including a timestamp to a server. The time stamp identifies the time when the requesting user logs in successfully.

Figure 9:
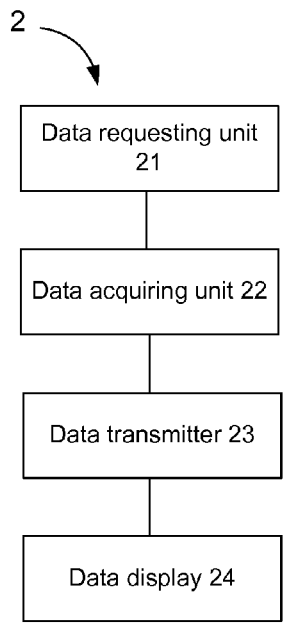

In an embodiment, as shown in FIG. 9, the terminal for data processing further includes a data display 24 configured to display the requesting user data queue, in which the timestamp is included.

It should be noted that the disclosure apply to all data exchange scenarios, which may include the scenario using tools of various social applications, such as data exchange scenario of microblog.

Application Embodiment 1

In this embodiment, the tool of social application used in the data exchange application scenario is microblog. The data exchange and processing are based on the components of the device for data processing located in the server and the terminal for data processing located in the user terminal described above.

In the microblog application of the embodiment, the data exchange request is triggered by an online command of a user after the user logs in successfully. The requesting user is a fan, the responding user is an idol, and the user correlation relationship is a relationship of listening and being listened between the fan and the idol. When the fan is a user with activity, the requesting user information of the fan is valid data. The activity is defined not by a state of online or offline but by an attention relationship of listening and being listened between the fan and the idol. For example, although a fan is online, the fan does not have a real-time attention relationship of mutual listening and being listened with the idol, so the fan is not a user with activity, the requesting user information of the fan is invalid data, and so forth. As to the definitions of idol and fan, when A listens to B, A is a fan of B and B is an idol of A. In this embodiment, A denotes a fan user and B denotes an idol user. As to the activity, if A published microblog or pulled a home page in 30 minutes, A is regarded as being active and online, otherwise, A is not active and offline.

Figure 10:
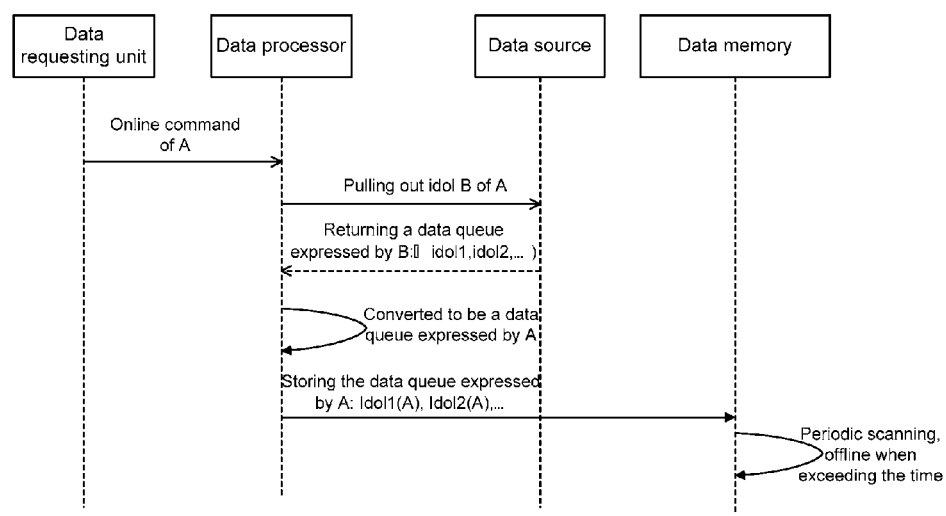
FIG. 10 illustrates a data exchange of application embodiment 1 of the disclosure.

As shown in FIG. 10, the flow of the embodiment includes the following processing:

(1) A data exchange request is triggered by online command of a user;

(2) After the online command id received, an idol link of fan A is acquired, which is A (idol 1, idol 2, . . . ) that is sorted and marked with B;

(3) A fan link (Idol 1(A), Idol 2(A), . . . ) is acquired by converting the data format of the idol link A (idol 1, idol 2, . . . ), which is sorted and marked with A;

(4) The fan link (Idol 1(A), Idol 2(A), . . . ) is stored into a Redis database;

(5) Periodic scanning is performed on the fans stored in the Redis database, if the fan has no update when the timestamp of the fan exceeds 30 minutes, the fan is deleted from the Redis database.

In the following, taking the microblog application scene as an example, the above preferable technical solutions of the disclosure are compared with the above Solution 1 and Solution 2 to illustrate the advantages of the preferable technical solutions of the disclosure described above.

Solution 1: Under the microblog application scenario, the data transmitted during the data exchange adopts a data format with a fixed memory capacitance, and the upper limit of a data size is ten thousand fans stored recently. The problem of this solution is that: the storage of the data is restricted to ten thousand fans and the redundant fans may be eliminated in first-in first-out way, in this way, the length may be restricted to only ten thousand online fans stored, however, many users may have more than one million online fans, so the data processing may only focus on the local data after setting the upper limit of the data quantity, and the quantity of valid data reduces along with the reduction of the data quantity during the data exchange; additionally, the data validity cannot be guaranteed, because the recent ten thousand fans are not all online while many online fans are not one of the ten thousand fans, thereby cannot reflecting the activity of users accurately.

Solution 2: Under the microblog application scenario, the data format of the data transmitted during the data exchange may not be limited, that is, all fans are pulled out to be processed to determine online fans. Specifically, all fans of a user are pulled out firstly, and online fans are determined through processing according state of all fans. The problem of this solution is that: the data size is large since the solution is directed to data of all fans, so more valid data can be acquired and the accuracy is higher; however, the overhead of communication and computation is too high, because the fans of many user may be as many as million even ten million, pulling all fans may lead to a great network overhead and acquiring online fans through processing may lead to large calculating overhead, which occupies huge system resource such as cache and therefore aggravates a load of CPU; additionally, delay is too much because the data size of the total fans is large and pulling and processing need a certain time that cause a great delay.

From the above, the Solution 1 and Solution 2 cannot both guarantee the data validity and ease the problems of occupation of system resource and increasing network overhead, because the two solutions both process data based on a unidirectional data that only direct to the fans of the users without considering the correlation, many fans can be acquired. Different from the Solution 1 and Solution 2, the above preferable technical solutions of the disclosure is based on bidirectional data that is processed according to the correlation of users. In the microblog application, the data processing is based on correlation relationship that is listening and being listened relationship between fans and idols, the quantity of the acquired data is much less than that acquired through the two existing solutions, also due to the correlation relationship, the probability that the fan becomes valid data is higher; additionally, valid data can be acquired fast due to the reduced quantity of exchanged data and the higher probability of the valid data, so the delay of data exchange is shortened.

Application Embodiment 2

In this embodiment, the tool of social application used in the data exchange application scenario is microblog.

Figure 11:
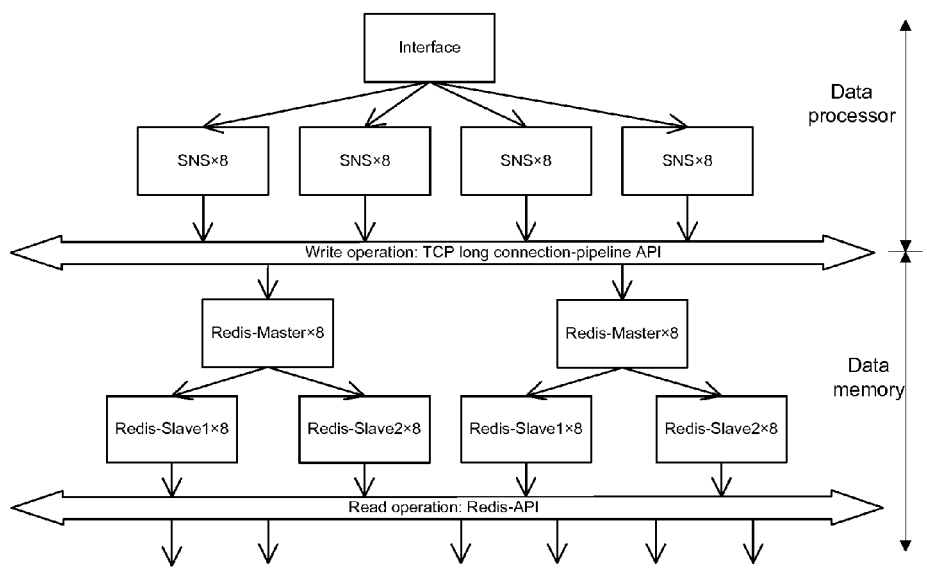
FIG. 11 illustrates a data exchange of application embodiment 2 of the disclosure.

FIG. 11 illustrates an interaction between a data processor and a data memory. As shown in FIG. 6, in this embodiment, the data memory adopts a logical structure with one master module and multiple slave modules, and Redis database.

When the data memory stores the data, the data memory adopts an ordered set of the Redis, which is called Zset for short. The following two problems are solved efficiently due to the feature of the ordered set: (1) the problem of duplication of data: multiple slave modules process concurrently and all transmit read data to the master module, so the transmission efficiency is high; since identical data stored on the multiple slave modules can share among these slave modules, which can ensure that no data is lost when any one of the slave modules fails, thereby increasing the security; the multiple slave modules may read repeated data into the master module, therefore, the master module needs to perform deduplication; under the microblog application scenario, automatic deduplication of online fans is performed to keep only one fan when duplication occurs; (2) the acquiring of timestamp: since all online fans of one user are sorted automatically according to their online time, it is very easy to acquire the timestamp.

When the data memory stores the data, the data format, i.e., a logic representation of storage structure is:

Uin: {(time 1, Fan 2), (time 2, Fan 2), (time 3, Fan 3), . . . } in which, Uin denotes a user account number of a user and is followed with online fan link of the user, each online fan is denoted with a pair tuple (time, Fan) where the time denotes the timestamp of online time, and Fan denotes the user account number of the fan.

The data processor acquires from the data memory the data to be processed and performs the processing.

It should be noted that the logical structure shown in FIG. 11 is a two-layer architecture, which includes a logical layer (e.g., the data processor) and a storing layer (e.g., the data memory) connected with the logical layer through the website. The two-layer architecture reduces the coupling of the system such that the logic and the storing may be maintained separately. Alternatively, the logical layer (e.g., the data processor) and the storing layer (e.g., the data memory) may be integrated together.

The logical layer (e.g., the data processor) and the storing layer (e.g., the data memory) adopt a pipeline Application Programming Interface (API) to communicate such that multiple fans may be added once in batch processing way without added separately time and time again, so the efficiency of operation is greatly improved and the entire delay is reduced.

The storing layer (e.g., the data memory) adopts a logical structure with one master module and multiple slave modules. The master module of the data memory performs write operation while the slave modules of the data memory perform read operation. This kind of structure is adapted for service with more reading and less writing, thereby improving the whole performance of the system.

Numbering of the embodiments in the disclosure is merely for illustration and does not indicate preference of one embodiment over another.

When being implemented in the form of a software functional unit and sold or used as a separate product, the units or modules of the embodiments of the disclosure may be stored in a computer-readable storage medium. Based on this understanding, the technical solutions of the embodiments of the disclosure essentially, or the part contributing to the prior art, may be implemented in the form of a software product. The computer software product is stored in a storage medium including a set of instructions for instructing computer equipment (such as a personal computer, a server, a network device, etc.) to execute all or a part of the method described in each embodiment of the disclosure. The above storage medium may be any medium capable of storing program codes, such as a U-disk, a mobile hard disk, a Read-Only Memory (ROM), a magnetic disk, and an optical disk. Therefore, the embodiments of the disclosure are not limited to any specific combination of hardware and software.

Accordingly, an embodiment of the disclosure further provides a non-transitory computer-readable storage medium storing a computer program including a set of computer executable instructions. When executed, the set of computer executable instructions may cause at least one processor to implement the method for data processing according to above embodiments of the disclosure.

The above mentioned are only the preferable embodiments of the disclosure and not intended to limit the scope of the disclosure.

The invention claimed is:

1. A method for data processing, comprising:
   receiving a data exchange request;
   acquiring a responding user data queue corresponding to a requesting user according to a user correlation relationship;
   sorting and marking the responding user data queue with responding user information;
   converting the responding user data queue into a requesting user data queue;
   sorting and marking the requesting user data queue with requesting user information; and
   transmitting the requesting user data queue to a user terminal.

2. The method according to claim 1, further comprising the step, preceding the transmitting step, of: encapsulating a timestamp into corresponding requesting user information included in the requesting user data queue, wherein the timestamp identifies a time when the requesting user logs in successfully.

3. The method according to claim 1 further comprising the step, preceding the transmitting step, of: deleting invalid data from the requesting user data queue.

4. The method according to claim 3, wherein the deleting step comprises:
   performing periodic scanning or timing scanning on the requesting user data queue;
   if certain requesting user information has no update when the timestamp exceeds a preset upper limit of time, determining that the certain requesting user information is invalid data; and
   deleting the certain requesting user information from the requesting user data queue.

5. The method according to claim 2 further comprising the step, preceding the transmitting step, of: deleting invalid data from the requesting user data queue.

6. The method according to claim 5, wherein the deleting step comprises:
   performing periodic scanning or timing scanning on the requesting user data queue;
   if certain requesting user information has no update when the timestamp exceeds a preset upper limit of time, determining that the certain requesting user information is invalid data; and
   deleting the certain requesting user information from the requesting user data queue.

7. A device for data processing, comprising a data processor and a transmitter, wherein:
   the data processor is configured to:
      receive a data exchange request, acquire a responding user data queue corresponding to a requesting user according to a user correlation relationship, and sort and mark the responding user data queue with responding user information; and
      convert the responding user data queue into a requesting user data queue, and sort and mark the requesting user data queue with requesting user information; and
   the transmitter is configured to transmit the requesting user data queue to a user terminal.

8. The device according to claim 7, wherein the data processor is further configured to encapsulate a timestamp into corresponding requesting user information included in the requesting user data queue, wherein the timestamp identifies the time when the requesting user logs in successfully.

9. The device according to claim 8, wherein the data processor is further configured to delete invalid data from the requesting user data queue.

10. The device according to claim 8, wherein the data processor is further configured to: perform periodic scanning or timing scanning on the requesting user data queue; if certain requesting user information has no update when the timestamp exceeds a preset upper limit of time, determine that the certain requesting user information is invalid data; delete the certain requesting user information from the requesting user data queue.

11. The device according to claim 7, being located in a background server.

12. The device according to claim 8, being located in a background server.

13. The device according to claim 9, being located in a background server.

14. The device according to claim 10, being located in a background server.

15. A non-transitory computer-readable storage medium including a set of instructions that, when executed, cause at least one processor to implement the following steps:
   receiving a data exchange request;
   acquiring a responding user data queue corresponding to a requesting user according to a user correlation relationship;
   sorting and marking the responding user data queue with responding user information;
   converting the responding user data queue into a requesting user data queue;
   sorting and marking the requesting user data queue with requesting user information; and
   transmitting the requesting user data queue to a user terminal.

16. The non-transitory computer-readable storage medium according to claim 15, further comprising instructions that, when executed, cause at least one processor to encapsulate a timestamp into corresponding requesting user information included in the requesting user data queue before transmitting the requesting user data queue to the user terminal, wherein the timestamp identifies a time when the requesting user logs in successfully.

17. The non-transitory computer-readable storage medium according to claim 15, further comprising instructions that, when executed, cause at least one processor to delete invalid data from the requesting user data queue before transmitting the requesting user data queue to the user terminal.

18. The non-transitory computer-readable storage medium according to claim 17, wherein the deleting step comprises:
- performing periodic scanning or timing scanning on the requesting user data queue;
- if certain requesting user information has no update when the timestamp exceeds a preset upper limit of time, determining that the certain requesting user information is invalid data; and
- deleting the certain requesting user information from the requesting user data queue.

19. The non-transitory computer-readable storage medium according to claim 16, further comprising instructions that, when executed, cause at least one processor to delete invalid data from the requesting user data queue before transmitting the requesting user data queue to the user terminal.

20. The non-transitory computer-readable storage medium according to claim 19, wherein the deleting step comprises:
- performing periodic scanning or timing scanning on the requesting user data queue;
- if certain requesting user information has no update when the timestamp exceeds a preset upper limit of time, determining that the certain requesting user information is invalid data; and
- deleting the certain requesting user information from the requesting user data queue.

\* \* \* \* \*